US012771624B2

(12) United States Patent
Pighetti et al.

(10) Patent No.: US 12,771,624 B2
(45) Date of Patent: Oct. 20, 2026

(54) INDICATING PERSONAL DATA IN AN HTTP MESSAGE

(71) Applicant: Telefonaktiebolaget LM Ericsson (publ), Stockholm (SE)

(72) Inventors: Maurizio Pighetti, Genoa (IT); Federico Pasini, Genoa (IT); Francesca Bruzzone, Cogoleto (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 63 days.

(21) Appl. No.: 18/876,461

(22) PCT Filed: Jun. 29, 2022

(86) PCT No.: PCT/SE2022/050655
§ 371 (c)(1),
(2) Date: Dec. 18, 2024

(87) PCT Pub. No.: WO2024/005679
PCT Pub. Date: Jan. 4, 2024

(65) Prior Publication Data
US 2025/0373679 A1 Dec. 4, 2025

(51) Int. Cl.
*H04L 43/04* (2022.01)
*G06F 21/62* (2013.01)
*H04L 9/40* (2022.01)

(52) U.S. Cl.
CPC .......... *H04L 43/04* (2013.01); *G06F 21/6254* (2013.01); *H04L 63/0421* (2013.01)

(58) Field of Classification Search
CPC . H04L 63/0407; H04L 63/0421; H04L 63/20; H04L 43/04; G06F 21/6254
See application file for complete search history.

(56) References Cited

U.S. PATENT DOCUMENTS 10,735,827 B2 8/2020 Ng et al.
11,283,624 B2 * 3/2022 Fregly .................... H04L 67/02
(Continued)

FOREIGN PATENT DOCUMENTS

CN 101790136 A 7/2010
EP 1343344 A1 9/2003
(Continued)

OTHER PUBLICATIONS

International Search Report and Written Opinion of the International Searching Authority, PCT/SE2022/050655, mailed Feb. 20, 2023, 12 pages.
(Continued)

*Primary Examiner* — Boris D Grijalva Lobos
(74) *Attorney, Agent, or Firm* — Sage Patent Group

(57) ABSTRACT

A network, a transmitter, a receiver, a method, a computer program and a computer program product for providing an indication of personal data in an HTTP message including a body is disclosed. The network includes the transmitter and the receiver. The network appends a header field to the HTTP message by the transmitter, wherein the appended header field indicates either presence or absence of personal data in the body, transmits the HTTP message including the appended header field to the receiver from the transmitter, receives the HTTP message including the appended header field and determines if the HTTP message includes personal data in the body based on the appended header field.

14 Claims, 5 Drawing Sheets

(56) References Cited

U.S. PATENT DOCUMENTS

| | | | | |
|---|---|---|---|---|
| 2009/0182619 | A1 | 7/2009 | Menditto et al. | |
| 2011/0126283 | A1 | 5/2011 | Homer | |
| 2013/0244616 | A1 | 9/2013 | Ding | |
| 2017/0099332 | A1 | 4/2017 | Bullotta et al. | |
| 2019/0036708 | A1* | 1/2019 | Fregly | H04W 4/02 |
| 2019/0191299 | A1 | 6/2019 | Shlomo | |
| 2019/0213283 | A1 | 7/2019 | Benkreira et al. | |
| 2019/0354709 | A1 | 11/2019 | Brinskelle | |
| 2020/0084184 | A1 | 3/2020 | Druker et al. | |
| 2023/0334169 | A1* | 10/2023 | De Paepe | G06F 21/6254 |
| 2024/0073186 | A1* | 2/2024 | Szigeti | H04L 69/22 |

FOREIGN PATENT DOCUMENTS

| | | | |
|---|---|---|---|
| EP | 3439271 | A1 | 2/2019 |
| WO | 0175559 | A2 | 10/2001 |

OTHER PUBLICATIONS

Whittle, Mark et al., "Final Report—Impact Assessment on Increased Protection of Internet-Connected Radio Equipment and Wearable Radio Equipment," (ETSI Draft), Centre for Strategy & Evaluation Services LLP (CSES), Apr. 2020, 219 pages.

Lear, E. et al., "Manufacturer Usage Description Specification," Internet Engineering Task Force (IETF), Request for Comments: 8520 (RFC 8520), Mar. 2019, 60 pages.

* cited by examiner

<table>
<tr><td>HTTP - message-type<br>110</td><td><Request></td><td>|</td><td><Response></td></tr>
<tr><td>HTTP-message header<br>120</td><td>field-name</td><td>":"</td><td>[field-value]</td></tr>
<tr><td>Body<br>130</td><td>......</td><td>..</td><td>....</td></tr>
</table>

INDICATING PERSONAL DATA IN AN HTTP MESSAGE

CROSS REFERENCE TO RELATED APPLICATIONS

This application is a 35 U.S.C. § 371 national stage application of PCT International Application No. PCT/SE2022/050655 filed on Jun. 29, 2022, the disclosure and content of which is incorporated by reference herein in its entirety.

TECHNICAL FIELD

The invention relates to a network for providing an indication of personal data in a Hypertext Transfer Protocol (HTTP) message comprising a body and for receiving the indication of personal data in the HTTP message, a transmitter for providing an indication of personal data in an HTTP message comprising a body, a receiver for receiving an indication of personal data in an HTTP message comprising a body, a method performed by the network, the transmitter and the receiver, and a corresponding computer program executed by the network, the transmitter and the receiver, and a corresponding computer program product for the network, the transmitter and the receiver.

BACKGROUND

In telecommunication networks and management systems, there is a consolidated trend that software architectures adopt a cloud-native architecture. A cloud-native application is architected specifically to run in an elastic and distributed nature required by modern cloud computing platforms. Cloud-native applications are loosely coupled, so that the applications can scale up and down on demand and embrace concepts of an immutable infrastructure. A typical implementation of cloud-native paradigm is that each part of the application is packaged in its own container, dynamically orchestrated so each part is actively scheduled and managed to optimize resource utilization, and microservices-oriented to increase the overall agility and maintainability of the applications. The microservices communicate with each other via their respective interfaces. A request from a client device can cross a number of microservices in an application before returning a response.

A service mesh is a programmable framework that enables observability, security, and connection to microservices. The service mesh is alternatively called a service mesh framework. The service mesh comprises a control plane and a data plane. The control plane provides policy and configuration for the data plane components that are currently executing/running in the service mesh and turns the data plane components into a distributed system. The data plane handles data traffic in the service mesh. The data plane is responsible for service discovery, health checking, routing, load balancing, authentication, authorization and observability. Main architecture drivers for the service mesh are reducing design complexity, providing service mesh properties to microservice based applications and enabling security by default.

From a perspective of Hypertext Transfer Protocol (HTTP) communication, an architecture of service mesh in a cloud native environment typically provides observability and security. Provision of observability comprises service level metrics for monitoring service communication such as latency, traffic, errors and saturation. Provision of security comprises functionalities such as Transport Layer Security (TLS)-based encryption of service-to-service communication, either over Layer 4 (L4) or Layer 7 (L7) of a communication protocol stack depending on the used protocols and providing service identities in the form of TLS certificates.

From the aspect of security which includes compliance to General Data Protection Regulation (GDPR), log files containing Personally Identifiable Information (PII) are very relevant. Identification of PII that is being processed is a crucial privacy enabler. Once the PII is identified, further privacy use cases such as search, modification, deletion, anonymization and pseudonymization can be enabled.

Anonymization is a method that replaces original clear text data with a value or representation that is both unrelatable to the original text data and permanently irretrievable. In pseudonymization, any information that can point to an identity of a subject is replaced by pseudonyms or identifiers. It is a reversible operation.

Data identification function can be implemented by data tagging. By assigning a privacy tag to personal data or PII, it becomes easier to separate the personal data or PII from the rest of the data. Data tagging is aimed at categorizing and labelling the personal data or PII. A logger is a middleware that logs information about HTTP messages. A logging framework implements the functionality of a logger. Logging framework services such as a log collector, a log transformer and a centralized log server can apply anonymization or pseudo-anonymization techniques to PII.

U.S. Pat. No. 10,735,827 B2 discloses a system for broadcasting that includes a watermark payload.

SUMMARY

An object of the invention is to improve security in a network using an HTTP message.

This and other objects are met by means of different aspects of the invention, as defined by the independent claims.

According to a first aspect, a transmitter in a network for providing an indication of personal data in a Hypertext Transfer Protocol, HTTP, message comprising a body is provided. The transmitter is configured to append a header field to the HTTP message, the appended header field indicating either presence or absence of personal data in the body; and transmit the HTTP message comprising the appended header field to a receiver.

A possible advantage is that modification of a format of the HTTP message's body is no longer required since the indication of personal data is provided in a way to avoid affecting a data structure in a microservice of an application running in a transmitter or receiver or the application itself. Another possible advantage may be that the invention provides a more performant mechanism to identify personal data in HTTP messages compared to parsing the entire HTTP message's body to detect possible privacy tags. Another possible advantage of the invention is that it allows a consumer of an HTTP message to be informed of personal data hosted in the HTTP message without relying on post-processing of the HTTP message's body based on information about potential personal data taken off-line from either a documentation or a model or a format of the HTTP message.

According to an embodiment, the appended header field comprises a Personally Identifiable Identifier, PII, header field.

According to an embodiment, the personal data comprises PII.

According to an embodiment, the personal data is subject to a regulation on data protection and privacy. In an embodiment, the regulation on data protection and privacy is General Data Protection Regulation, GDPR.

According to an embodiment, the appended header field comprises at least one key.

According to an embodiment, the HTTP message is an HTTP request message or an HTTP response message.

According to a second aspect, a receiver in a network for receiving an indication of personal data in an HTTP message comprising a body is provided. The receiver is configured to receive the HTTP message comprising an appended header field indicating either presence or absence of personal data in the body from a transmitter; and determine if the HTTP message comprises personal data in the body based on the appended header field.

According to an embodiment, the receiver is configured to log the HTTP message.

According to an embodiment, the receiver is configured to tag the personal data in the HTTP message. A possible advantage of the embodiment may be that, as information on potential personal data is separated from actual user data, a service mesh framework for an application or a microservice running in a transmitter or a receiver can be extended with a purpose to consume the HTTP message's header on behalf of a service and provide functionalities such as automatic tagging of personal data once a log is written.

According to an embodiment, the receiver is configured to anonymize or pseudo-anonymize the logged HTTP message.

According to an embodiment, the receiver is configured to capture a header comprising the appended header field of the HTTP message using a logging framework.

According to an embodiment, the receiver is configured to parse the HTTP message if the appended header field indicates presence of personal data.

According to a third aspect, a method performed by a transmitter in a network for providing an indication of personal data in an HTTP message comprising a body is provided. The method comprises appending a header field to the HTTP message, the appended header field indicating either presence or absence of personal data in the body; and transmitting the HTTP message comprising the appended header field to a receiver.

According to an embodiment, the appended header field comprises a PII header field.

According to an embodiment, the personal data comprises PII.

According to an embodiment, the personal data is subject to a regulation on data protection and privacy. In an embodiment, the regulation on data protection and privacy is General Data Protection Regulation, GDPR.

According to an embodiment, the appended header field comprises at least one key.

According to an embodiment, the HTTP message is an HTTP request message or an HTTP response message.

According to a fourth aspect, a method performed by a receiver in a network for receiving an indication of personal data in an HTTP message comprising a body is provided. The method comprises receiving the HTTP message comprising an appended header field indicating either presence or absence of personal data in the body from a transmitter; and determining if the HTTP message comprises personal data in the body based on the appended header field.

According to an embodiment, the method comprises logging of the HTTP message.

According to an embodiment, the method comprises tagging tag of the personal data.

According to an embodiment, the method comprises anonymizing or pseudo-anonymizing of the logged HTTP message.

According to an embodiment, the method comprises capturing of a header comprising the appended header field of the HTTP message using a logging framework.

According to an embodiment, the method comprises parsing of the HTTP message if the appended header field indicates presence of personal data.

According to a fifth aspect, a transmitter in a network for providing an indication of personal data in an HTTP message comprising a body is provided. The transmitter comprises at least one processor and memory comprising instructions executable by the at least one processor. The instructions when executed by the at least one processor causes the transmitter to perform the method according to the third aspect.

According to a sixth aspect, a computer program comprises instructions which, when executed by at least one processor of a transmitter, causes the transmitter to carry out the method according to the third aspect.

According to a seventh aspect, a computer program product stored on a non-transitory computer readable (storage or recording) medium is provided. The computer program product comprises instructions that, when executed by a processor of a transmitter, cause the transmitter to perform the method according to the third aspect.

According to an eighth aspect, a receiver in a network for receiving an indication of personal data in an HTTP message comprising a body is provided. The receiver comprises at least one processor and memory comprising instructions executable by the at least one processor. The instructions when executed by the at least one processor causes the receiver to perform the method according to the fourth aspect.

According to a ninth aspect, a computer program comprises instructions which, when executed by at least one processor of a receiver, causes the receiver to carry out the method according to the fourth aspect.

According to a tenth aspect, a computer program product stored on a non-transitory computer readable (storage or recording) medium is provided. The computer program product comprises instructions that, when executed by a processor of a receiver, cause the receiver to perform the method according to the fourth aspect.

According to an eleventh aspect, a network for providing an indication of personal data in an HTTP message comprising a body and for receiving the indication of personal data in an HTTP message is provided. The network comprises a transmitter and a receiver. The network is configured to append a header field to the HTTP message by the transmitter, the appended header field indicating either presence or absence of personal data in the body; transmit the HTTP message comprising the appended header field to the receiver from the transmitter; receive the HTTP message comprising the appended header field; and determine if the HTTP message comprises personal data in the body based on the appended header field.

According to a twelfth aspect, a method performed by a network for providing an indication of personal data in an HTTP message comprising a body and for receiving the indication of personal data in the HTTP message is provided. The network comprises a transmitter and a receiver. The method comprises appending a header field to the HTTP message by the transmitter, the appended header field indicating either presence or absence of personal data in the body; transmitting the HTTP message comprising the appended header field to the receiver from the transmitter; receiving the HTTP message comprising the appended header field; and determining if the HTTP message comprises personal data in the body based on the appended header field.

According to a thirteenth aspect, a network for providing an indication of personal data in an HTTP message comprising a body and for receiving the indication of personal data in the HTTP message is provided. The network comprises at least one processor and memory comprising instructions executable by the at least one processor. The instructions when executed by the at least one processor causes the network to perform the method according to the twelfth aspect.

According to a fourteenth aspect, a computer program comprises instructions which, when executed by at least one processor of a network, causes the network to carry out the method according to the twelfth aspect.

According to a fifteenth aspect, a computer program product stored on a non-transitory computer readable (storage or recording) medium is provided. The computer program product comprises instructions that, when executed by a processor of a network, cause the network to perform the method according to the twelfth aspect.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

Figures 1, 2:
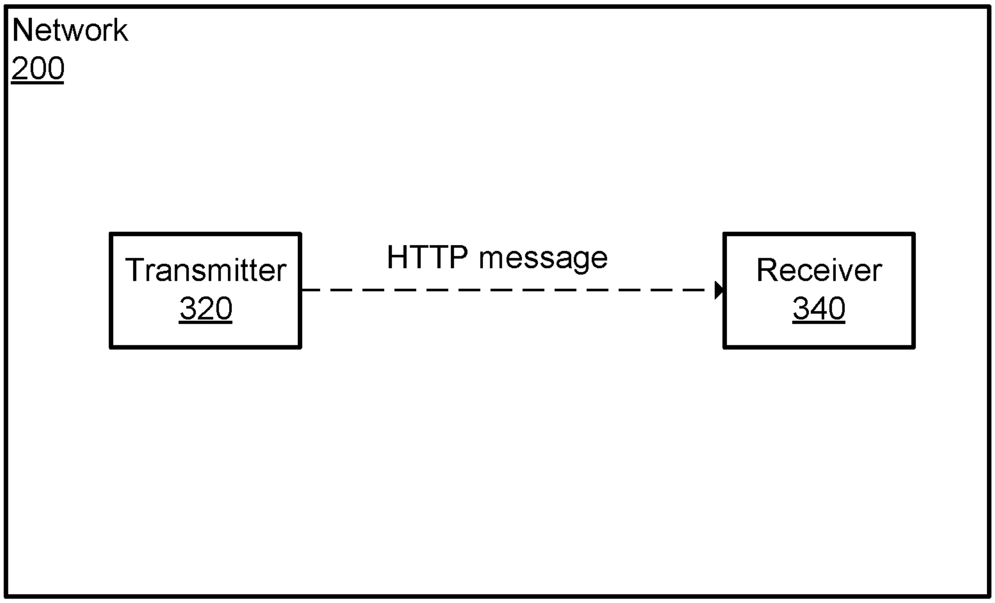
FIG. 1 illustrates a format of an HTTP message.
FIG. 2 illustrates a network, in accordance with an embodiment of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

This invention describes a transmitter, a method performed by a transmitter, a receiver, a method performed by a receiver, a network, and a method performed by a network for providing an indication of personal data in a Hypertext Transfer Protocol (HTTP) message comprising a body. An object of the invention is to improve security in a network wherein HTTP is being used. An object of the invention is to improve privacy subject to personal data in a network.

In the following, the network may be a telecommunications network, a local area network, a wide area network, a vehicular communication network, a cloud-native network, an Internet of Things (IoT) network, a 3$^{rd}$ Generation Partnership Project (3GPP) based network, a non-3GPP network, a network comprising both 3GPP and non-3GPP components, and a network comprising a combination of all the aforementioned network types. Preferably, the network comprises a transmitter. Preferably, the network comprises a receiver. Examples of a transmitter and/or a receiver in the network are, but not limited to, a 3GPP network node, a non-3GPP network node or any other node in any of the aforementioned network types. In an embodiment, the transmitter 320 and the receiver 340 may comprise a server host and a client device, respectively. The server host and the client device host a server software and a client software, respectively. The transmitter and/or the receiver specified herein may either be a user device such as a User Equipment (UE) or a network device such as a base station, a core network node and an external 3$^{rd}$ party node. Also, the transmitter, the receiver or the network, or all of the transmitter, the receiver and the network, herein may be capable of running an application. The application may be a cloud-native application or any other application.

The invention disclosed herein may also be used for providing an indication of personal data in a Hypertext Transfer Protocol Secure (HTTPS) since HTTPS is an extension of HTTP.

Personal data refers to any information that relates to a directly or indirectly identified or identifiable natural person. An identifiable natural person is a person who can be identified, directly or indirectly, in particular by reference to an identifier such as a name, an identification number, location data, an online identifier or to one or more factors specific to the physical, physiological, genetic, mental, economic, cultural or social identity of that natural person. An example of personal data may be email address, name, date of birth, phone number and residential address. In an example, personal data comprises Personally Identifiable Information (PII). PII relates to any information that can be used to identify a particular individual or an entity. PII relates to information that, when used either alone or with other relevant data, can identify an individual. Examples of other personal data are, but not limited to, direct identifiers such as social security number and passport number, and/or quasi-identifiers such as name, address, phone number, date of birth and ethnicity. In an embodiment, personal data may be PII. Quasi-identifiers can be used with other quasi-identifiers to identify an individual. In an embodiment, personal data may be personal information subject to a regulation on data protection and privacy. In an embodiment, personal data may be personal information subject to a data privacy and security law. In an embodiment, the regulation on data protection and privacy comprises General Data Protection Regulation (GDPR). In some embodiments, the personal data may be personal data as described in GDPR or any other data protection/security guidelines. In an embodiment, personal data comprises personal information.

A method as described in prior art for a microservice or an application to understand whether an HTTP message comprises PII. A method for identifying personal data in HTTP messages could be by not reporting any information on PII in the HTTP message. In this method, the HTTP message receivers do not have any information on where to find personal data based on the HTTP message's body but they can apply tags on or obfuscate personal data only by relying on off-line information such as the HTTP message producer's documentation, models and/or hardcoding which fields comprise personal data. The HTTP message receivers may also be called HTTP message consumers. In an example of JSON body below, the message consumer(s) is not aware from the message that the "username" and the "email" fields contain PII:

{"id":"d7ce343d-bb7a-4908-9f19-cb69545c100b","createdTimestamp":1622541727812,"username":"my-user","enabled":true,"totp":false,"emailVerified":false,"email":"my-user@myOrg.org"}

This prior art approach of not reporting any information on PII has the following drawbacks: i) the identification of PII is hard-coded, that is, intervention is needed at development time. ii) In addition to the normal dependency between services, the HTTP message consumer(s) would have an additional dependency on the HTTP message producer for understanding the PII; if the HTTP message producer upgrades their model, the HTTP message consumer(s) must upgrade too. The upgrade must be simultaneous to avoid potential unexpected exposure of personal data.

Another method as described in prior art for identifying PII in an HTTP message is by tagging personal data in the 'value' field in the HTTP message's body. The same approach as tagging of PII in logs could be applied to key-value pairs in a JavaScript Object Notation (JSON) representation or an Extensible Markup Language (XML) representation of a GET response's body. In the example below, personal data are tagged by the response producer by using company E's proprietary format:

{"id":"aa-bb-cc-dd-ee", "createdTimestamp":1622541727812, "user ID": "[priv5]my-user[/priv5]", "enabled":true, "totp":false, "emailVerified":false, "email":"[priv6]my-user@myOrg.org[/priv6]"}

This prior art approach of tagging PII in the value field of the HTTP message's body has the drawback that a receiver at the response end must go through the whole response body, parse each value and check for presence of tags. A receiver may be called a consumer. This is time consuming and at the very least, reduces efficiency.

Yet another method as described in prior art for identifying PII in an HTTP message is by adding a specific field for privacy information in a format used in the HTTP message's body. A specific field for PII could be added in the JSON body of the HTTP message, the specific field could specify which fields contain PII and/or a tag for PII (see in bold):

{"id":"aa-bb-cc-dd-ee", "createdTimestamp":1622541727812, "user ID": "my-user", "enabled":true, "totp":false, "emailVerified":false, "email":"my-user@myOrg.org", "PII": "[priv5]my-user[/priv5] [priv6]my-user@myOrg.org[/priv6]" }

This prior art approach of identifying PII in an HTTP message is by adding a specific field for privacy information in the format used in the HTTP message's body has the following drawback: i) All format used in responses are affected by the new field for personal information, that is, PII. This creates a need for massive changes in all applications. ii) The response body must still be parsed for all messages to check the field for PII.

The prior art solutions have been described to underline the differences between the present invention and the prior art.

FIG. 1 illustrates a format of an HTTP message. The HTTP message comprises a type of HTTP message denoted by 'HTTP-message-type' 110, at least one header field denoted by 'HTTP-message header' 120 and, a body 130. The type of the HTTP message 110 may be either an HTTP request message or an HTTP response message. The HTTP header field 120 may be represented by a colon-separated field-name with a corresponding field-value. The field-name and the field-value may be alternatively called a key and a value, respectively. Examples of HTTP field-names with corresponding field-values are "Host: www.example.com" and "Date: Mon, 27 Jul. 2009 12:28:53 GMT". The body 130 may comprise data from the HTTP request or the HTTP response. An example of the body may be as simple as "Hello, world!".

FIG. 2 illustrates a network 200, in accordance with an embodiment of the invention. The network 200 comprises a transmitter 320 and a receiver 340 that are capable of transmitting HTTP messages. According to the invention, the transmitter 320 and the receiver 340 exchange an HTTP message wherein an indication of personal data is included. The transmitter 320 provides an indication of personal data in a Hypertext Transfer Protocol, HTTP, message comprising a body, and a receiver 340 for receives an indication of personal data in a Hypertext Transfer Protocol, HTTP, message comprising a body. In an embodiment, the body may be called a payload. The transmitter 320 is configured to append a header field to the HTTP message. The appended header field indicates either presence or absence of personal data in the body of the HTTP message to be transmitted. In an embodiment, the appended header field may provide a '1' for presence of personal data and '0' for absence of personal data. In another embodiment, the appended header field may provide a '0' for presence of personal data and a '1' for absence of personal data. The appended header field is a part of the HTTP message's header. The transmitter 320 is further configured to transmit the HTTP message comprising the appended header field. The receiver 340 is configured to receive the HTTP message comprising the appended header field indicating either presence or absence of personal data in the body from the transmitter 320. The receiver 340 is configured to determine if the HTTP message comprises personal data in the body based on the appended header field. In some embodiments, the transmitter 320 is part of a router or a UE or any other networking node.

In an embodiment, the server host transmits an HTTP message to the client device, and the client device receives the HTTP message from the server host. The server host is configured/adapted/operable to append a header field to the HTTP message's header. The appended or added header field indicates either presence or absence of personal data in the body of the HTTP message. The server host is further configured/adapted/operable to transmit the HTTP message comprising the appended or added header field to the client device. The client device is further configured to determine if the HTTP message comprises personal data in the body based on the appended header field. The HTTP message may be either a HTTP request message or an HTTP response message. In an embodiment, personal data comprises PII.

Figure 3:
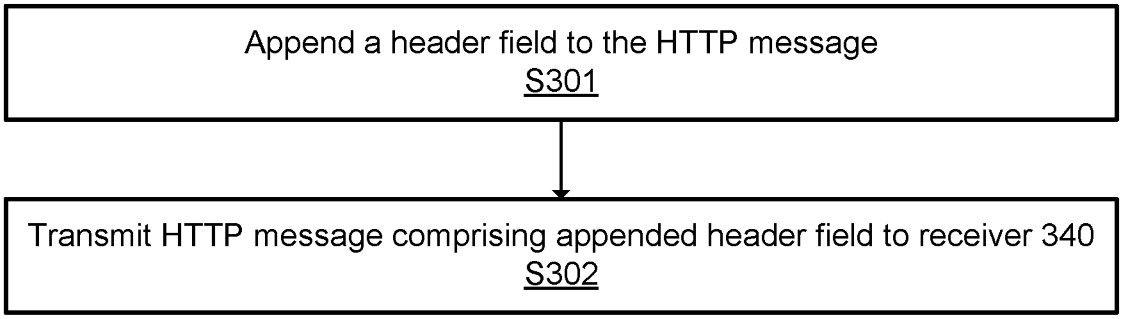
FIG. 3 illustrates a flowchart depicting an embodiment of a method in a transmitter for providing information on personal data in an HTTP message comprising a body.

FIG. 3 illustrates a flowchart depicting embodiments of a method in a transmitter 320 for providing information on personal data in an HTTP message comprising a body. In S301, the transmitter 320 is configured to append a header field to the HTTP message. The appended header field is based on defining a non-standard field in the HTTP message's header and the appended header field indicates either presence or absence of personal data in the body. In an embodiment, the appended header field comprises at least one key. Each key is associated with a value, thus the appended header field comprises a pair including a key and its value. The pair may be called a key-value pair. Example of a key-value pair may be "email": "myuser@myorg.org" wherein the key is 'email ID' and the value is 'myuser@myorg.org'. In an embodiment, the appended header field may indicate that personal data is present in the body by providing which key of the at least one key in the body (more than one key can be present in the body) contain personal data. In another embodiment, the indication may provide which type of personal data is present in the body by providing related tags. In S302, the transmitter 320 is configured to transmit the HTTP message comprising the appended header field to a receiver 340. The header field, which is a non-standard field in the HTTP header field, may specify which key(s) in the body contains personal data, and a type of personal data by providing a related tag.

In some embodiments, the appended header field is a personal data header field. In some embodiments, the personal data comprises PII. As per GDPR, the personal data are preferably tagged. In some embodiments, the appended header field comprises at least one key. In an embodiment, the appended header field comprises information about type of personal data present in the HTTP message comprising a body. The appended header field comprises at least one key-value pair if JSON data format is used in the network 200. In some embodiments, the HTTP message is an HTTP request message. In some embodiments, the HTTP message is an HTTP response message. In some embodiments, the method performed by the transmitter 320 may be a functionality that is available in a router or a UE or any other networking node. In some embodiments, the HTTP message is an HTTP 1.1 message or an HTTP/2 message or an HTTP/3 message or any future generation of HTTP-based message. In some embodiments, the appended header field may be a non-standard HTTP header field. In some embodiments, the method of the transmitter 320 may be a functionality that is available in a network 200 which may be a cloud environment or a cloud-native environment or a virtualized network or a software-based network.

Figure 4:
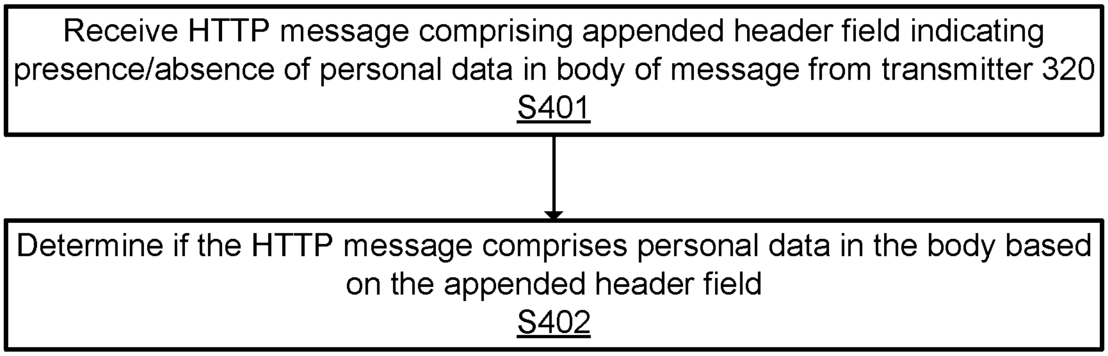
FIG. 4 illustrates a flowchart depicting an embodiment of a method in a receiver for receiving information on personal data in an HTTP message comprising a body.

FIG. 4 illustrates a flowchart depicting embodiments of a method in a receiver 340 for receiving information on personal data in an HTTP message comprising a body. In S401, the receiver 340 is configured to receive the HTTP message comprising an appended header field indicating either presence or absence of personal data in the body from a transmitter 320. In S402, the receiver 340 is configured to determine if the HTTP message comprises personal data in the body based on the appended header field.

In some embodiments, the receiver 340 is configured to log the HTTP message. In an embodiment, the receiver 340 is configured to tag the personal data from the logged HTTP message. In some embodiments, receiver 340 is configured to anonymize or pseudo-anonymize the logged HTTP message. In some embodiments, the receiver 340 is configured to capture a header of the HTTP message comprising the appended header field by a logging framework. In an embodiment, the logging framework reads only the header and the logged HTTP message. In some embodiments, the receiver 340 is configured to parse the HTTP message when the appended header field indicates presence of personal data. In some other embodiments, the receiver 340 is configured to parse the HTTP message when the appended header field indicates absence of personal data. Parsing refers to extraction of fields from the body of the HTTP message. In some embodiments, after parsing, the HTTP message is processed. In some embodiments, processing may be simply passing the HTTP message from a node in the network to another node in the network or processing may be performing an operation such an anonymizing or pseudo-anonymizing.

Figure 5:
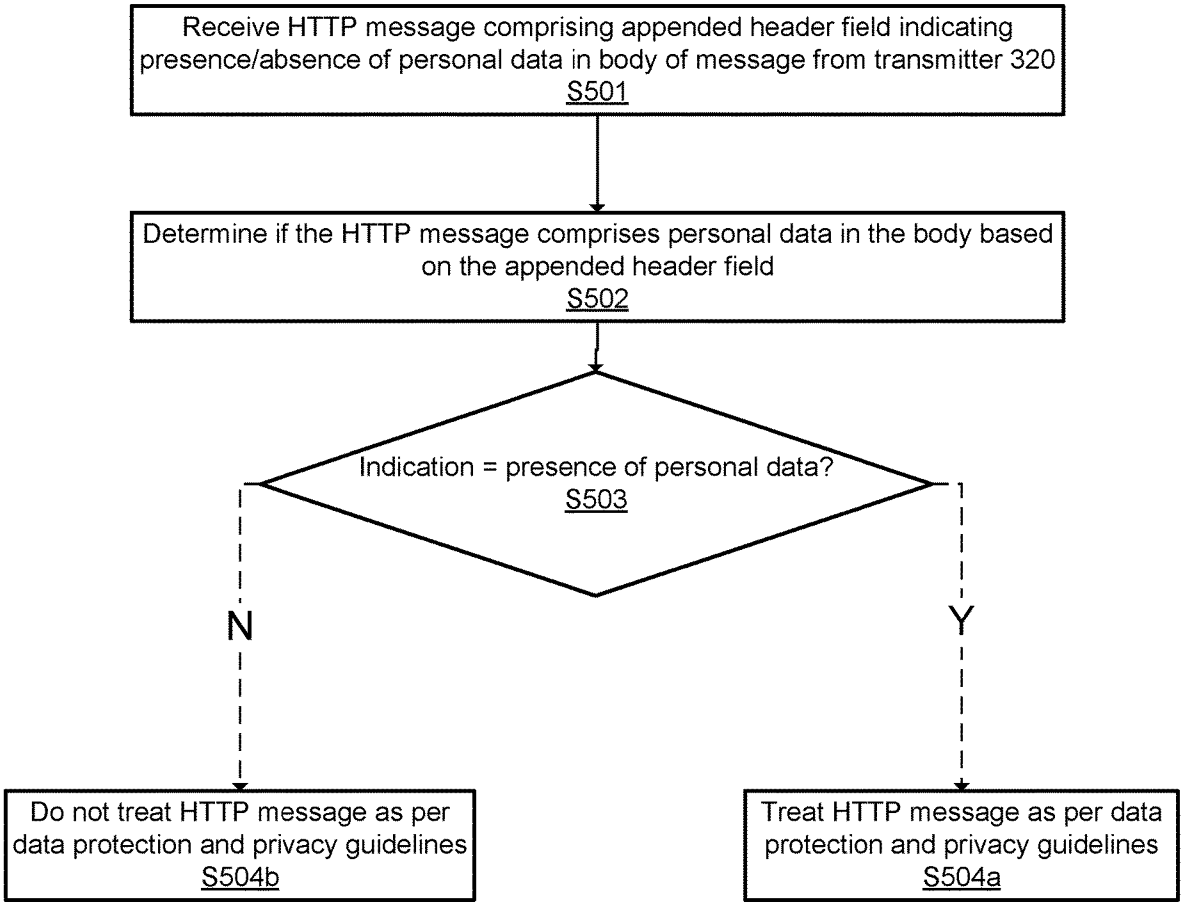
FIG. 5 illustrates a flowchart of a method in a receiver according to an embodiment of the invention.

FIG. 5 illustrates a flowchart of a method in a receiver 340 according to an embodiment of the invention. The receiver 340 is configured to receive an indication of personal data in a Hypertext Transfer Protocol, HTTP, message comprising a body. In S501, the receiver 340 is configured to receive the HTTP message comprising an appended header field indicating either presence or absence of personal data in the body from a transmitter 320. In S502, the receiver 340 is further configured to determine if the HTTP message comprises personal data in the body based on the appended header field. In S503, if the indication and determination suggest that the HTTP message contains personal data, then S504*a* is performed else if the indication and determination suggest that the HTTP message does not contain personal data, then S504*b* is performed. In an embodiment, the receiver 340 is configured to execute an application or a microservice in an application. In S503*a*, the receiver 340 is configured to treat the personal data as per a regulation of data protection and privacy or as per a set of privacy rules or privacy design rules. In an embodiment, a regulation of data protection and privacy is GDPR. In an embodiment, the application or the microservice in the application in the receiver 340 treat the personal data as per a regulation of data protection and privacy or as per a set of privacy rules or privacy design rules. In an embodiment, the receiver 340 is configured to tag the personal data in the HTTP. In an embodiment, the receiver 340 is configured to log the HTTP message. In S504*b*, the receiver 340 is configured to not treat the body as per a regulation of data protection and privacy or as per a set of privacy rules or privacy design rules. In an embodiment, the application or the microservice in the application in the receiver does not treat the HTTP message as per a regulation of data protection and privacy or as per a set of privacy rules or privacy design rules.

The receiver 340 (preferably with the support of infrastructure components such as a service mesh) may understand whether an HTTP message comprises personal data by reading the appended header field, without the need to parse all contents of the HTTP message's body each time for this purpose. The receiver 340 or the infrastructure components on behalf of it know which (if any) personal data are to be tagged. In an embodiment, the HTTP receiver may be an HTTP message consumer. In case there is an indication of presence of personal data in the appended header field, the HTTP message consumer or the receiver may handle the HTTP message's body with the purpose to provide personal data tagging in logs and anonymization and/or pseudonymization as required by GDPR or any other data protection law.

A new field can be added or appended to the header of a HTTP message without breaching any restrictions imposed by Internet Engineering Task Force (IETF). An addition or appending of a new field to the header of an HTTP message is fully compliant with rules and regulations set forth by the IETF. As per IETF's HTTP semantics document, a new field can be introduced without changing a protocol version of HTTP if the new field's semantics are defined and allow to be safely ignored by a receiver that does not recognize the new field. Thus, a new tag or new tags may be added in the header field without any problem.

In an embodiment, the appended header field in the HTTP message may be structured in a way defined as:

Privacy: {<Key name>: <Tag name> [, <Key name>: <Tag name>}

In an embodiment, from the example in previous paragraphs, the appended header field may be defined as:

Privacy: {"country": "priv9"}

The described invention may be used in an application in any cloud-native architecture. In an example, a use of the invention includes that infrastructure components such as a service mesh may process the header in a way to configure a cloud-based logging framework to apply tags to the personal data without impacting workload of a service. Each service in a microservice-based application or a microservice-based architecture can write a log(s) and a corresponding service mesh or a corresponding logging framework infrastructure may apply tagging of personal data in an HTTP message traversing through the application or the architecture. The invention herein advantageously enables the service or the microservice to automatically comply with a requirement on personal data tagging in the log(s) as set forth in a regulation of data protection and privacy such as GDPR or as per a set of privacy rules or privacy design rules.

Figure 6:
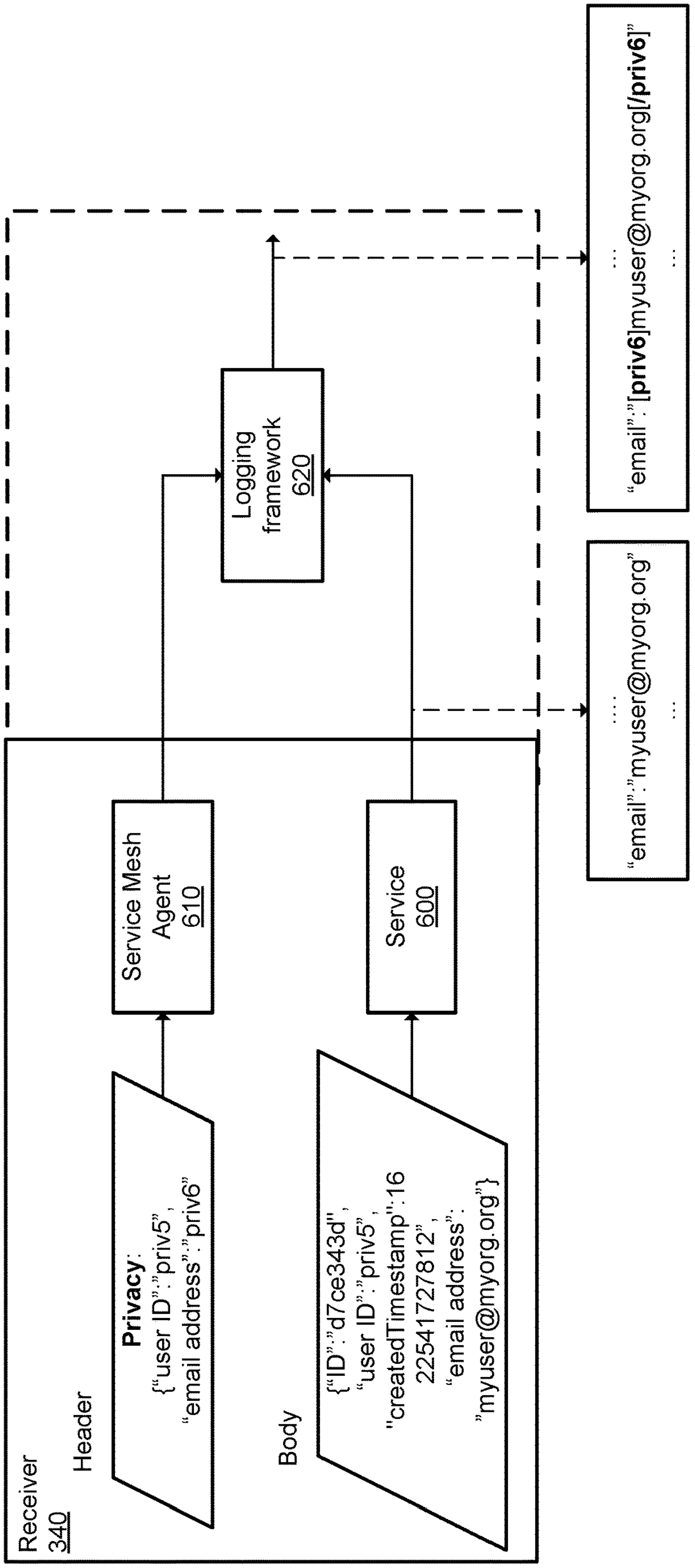
FIG. 6 illustrates an example service in a receiver implementing a method in accordance with an embodiment of the invention.

FIG. 6 illustrates an example of a service 600 in a receiver 340 implementing a method in accordance with an embodiment of the invention. In an embodiment, the receiver 340 may be capable of running or executing the service 600. In an embodiment, the receiver 340 comprises the service 600. The service 600 comprises a service mesh agent 610 and uses a logging framework 620. The service 600 may be integrated with a service mesh or integrated with an infrastructure service. The service mesh is a dedicated infrastructure layer for facilitating service-to-service communication between services or microservices, using the service mesh agent 610. The service mesh agent 610 may be an infrastructure service agent. The logging framework 620 may be library. Alternatively, the service mesh may be called a service mesh framework.

The receiver 340 comprising the service 600 in a network 200 for receiving an indication of personal data in an HTTP message comprising a body is disclosed. The receiver 340 comprising the service 600 is configured to receive the HTTP message comprising an appended header field indicating either presence or absence of personal data in the body from a transmitter 320 and determine if the HTTP message comprises personal data in the body based on the appended header field. The receiver 340 comprising the service 600 is further configured to produce a log of a body in an HTTP message, and the service 600 is configured to send the log to the logging framework 620. If a receiver 340 receives an indication of presence of personal data in an HTTP message comprising a body, the receiver 600 is configured to tag the log of the personal data at the logging framework or the library 620. In an example, if "email": "myuser@myorg.org" was logged at the service 600, the logging framework 620 produces a tag such as "email":

"[priv6] myuser@myorg.org [/priv6]". Example of a logging framework is Elastic suite comprising ElasticSearch, Logstash and Kibana. Upon using the receiver 340 as described in the example, information on potential personal data is separated from actual user data. Thus, a service mesh framework for an application or a microservice running in the transmitter 320 or the receiver 340 may be extended with a purpose to consume the HTTP message's header on behalf of the service 600 and provide functionalities such as automatic tagging of the personal data once the log of the body is written. An example of a service mesh framework is Istio.

Figure 7:
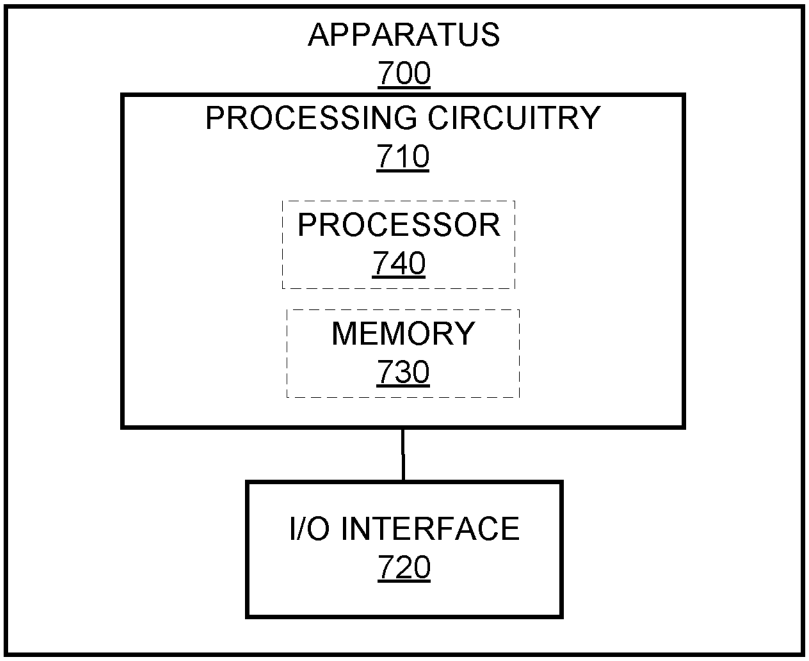
FIG. 7 illustrates an example of an apparatus as implemented as implemented in accordance with an embodiment of the invention.

FIG. 7 illustrates an example of an apparatus 700 as implemented as implemented in accordance with an embodiment of the invention. The apparatus 700 may be either a transmitter 320 or a receiver 340. A processing circuitry 710 is adapted/configured/operable to cause the controller to perform a set of operations, or for example, steps, S301, S302, S401, S402, S501, S502, S503, S504*a*, S504*b* as disclosed above, e.g., by executing instructions stored in memory 730. The processing circuitry 710 may comprise one or more of a microprocessor, a controller, a microcontroller, a central a processing unit, a digital signal processor, an application-specific integrated circuit, a field programmable gate array, or any other suitable computing device, resource, or combination of hardware, software and/or encoded logic operable to provide, either alone or in conjunction with other components of the apparatus 700, such as the memory 730, in order to provide relevant functionality. The processing circuitry 710 in this regard may implement certain functional means, units, or modules. Memory 730 may include one or more non-volatile storage medium and/or one or more volatile storage medium or a cloud-based storage medium. In embodiments where processing circuitry 710 includes a programmable processor 740, a computer program product 810 may be provided in the transmitter 320 or the receiver 340. Such computer program product is described in relation to FIG. 8.

The memory 710 may store any suitable instructions, data, or information, including software, an application including one or more of logic, rules, code, tables, and/or other instructions/computer program code capable of being executed by the processing circuitry 710 and utilized by the apparatus 700. The memory 730 may further be used to store any calculations made by the processing circuitry 710 and/or any data received via the I/O interface circuitry 720, such as input from the apparatus 700. In some embodiments, the processing circuitry 710 and memory 730 are integrated.

Figure 8:
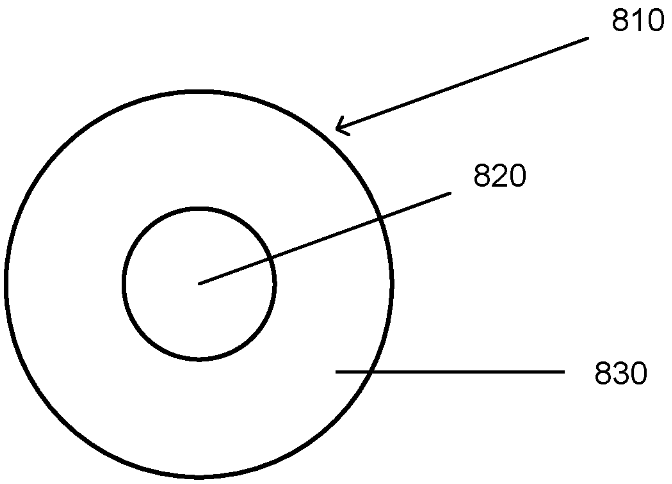
FIG. 8 illustrates a computer program product, in accordance with an embodiment of the invention.

FIG. 8 illustrates one example of a computer program product in accordance with an embodiment of the invention. Computer program product 810 includes a computer readable storage medium 830 storing a computer program 820 comprising computer readable instructions. Computer readable medium 830 of the apparatus 700, may be a non-transitory computer readable medium, such as, magnetic media (e.g., a hard disk), optical media, memory devices (e.g., random access memory, flash memory), and the like. In some embodiments, the computer readable instructions of computer program 820 are configured such that when executed by processing circuitry 710, the computer readable instructions cause the apparatus 700 to perform steps described herein (e.g., S301, S302, S401, S402, S501, S502, S503, S504*a*, S504*b*). In other embodiments, the apparatus 700 may be configured/operable to perform steps described herein without the need for code. That is, for example, processing circuitry 710 may consist merely of one or more ASICs. Hence, the features of the embodiments described herein may be implemented in hardware and/or software.

The computer program code mentioned above may also be provided, for instance in the form of a data carrier carrying computer program code for performing the embodiments herein when being loaded into the hardware. One such carrier may be in the form of a CD ROM disc. It is however feasible with other data carriers such as a memory stick. The computer program code may furthermore be provided as pure program code on a server and downloaded to the hardware device at production, and/or during software updates.

The person skilled in the art realizes that the invention by no means is limited to the embodiments described above. On the contrary, many modifications and variations are possible within the scope of the appended claims. Examples of a transmitter 320 include, but are not limited to, virtual network functions, cloud-native and non-cloud-native applications, Node Bs, evolved Node Bs (eNBs), NR nodeBs (gNBs), radio access points (APs), relay nodes, remote radio head (RRH), a node in a distributed antenna system (DAS), etc. Examples of a receiver 340 include, but are not limited to, virtual network functions, cloud-native and non-cloud-native applications, Node Bs, evolved Node Bs (eNBs), NR nodeBs (gNBs), radio access points (APs), relay nodes, remote radio head (RRH), a node in a distributed antenna system (DAS), etc. Additionally, the network 200 described herein could be a network for autonomous vehicles, a telecommunication network, a fleet of vehicles embedded with communication modules, an industrial environment, a manufacturing plant, an appliance with multiple networking components or a combination of multiple environments. In an example, Apache 2.3 server by default limits the size of each field to 8190 bytes, and there can be at most 100 header fields in a single HTTP message. Considering that a size for each personal data item may be from 2 to 30 bytes, even in a case wherein 70 different tags are used for different personal data, only around 2,000 bytes of header field space at the maximum would be used. Thus, an appended header field would be a useful and informative way to describe an HTTP message's body.

In an embodiment, the network 200 may be an Open Radio Access Network (O-RAN) system for next generation radio access networks. In existing implementations of O-RAN, the network 200 herein could be implemented in an intelligent controller with nodes connected to the controller. An O-RAN system employing the method as described in the disclosure of this invention would realize the benefits of the invention such as providing a more performant mechanism to identify personal data in HTTP messages compared to parsing the entire HTTP message's body to detect possible privacy tags. Therefore, reducing resource consumption for identifying personal data in an HTTP message leading to a reduced carbon footprint. The advantages presented by the disclosure of this invention are: the entire HTTP message does not need to be parsed to identify personal data; a static list of personal data in an HTTP message's body is not required. Example, third byte to fifth byte in the body are personal data; the HTTP message's body is not corrupted by adding or appending any data/text relating to personal data; the HTTP message's body may be logged without parsing the body; and last but not the least, the transmitter 320 is aware of personal data in the HTTP message.

Although an apparatus has been used in the above embodiments, a person skilled in the art understands that the apparatus may also be a UE, an Internet of Things (IoT)

device, a virtual machine, a cloud-computing node, an edge node, any electronic device with a network interface chip, a network management node, Operations Sub-System (OSS), Network Management System (NMS) and a 2G/3G/4G/5G/6G network node.

The transmitter 320 or the receiver 340 in the form of an IoT device may be a device for use in one or more application domains, these domains comprising, but not limited to, home, city, wearable technology, extended reality, industrial application, and healthcare.

By way of example, the IoT device for a home, an office, a building or an infrastructure may be a baking scale, a coffee machine, a grill, a fridge, a refrigerator, a freezer, a microwave oven, an oven, a toaster, a water tap, a water heater, a water geyser, a sauna, a vacuum cleaner, a washer, a dryer, a dishwasher, a door, a window, a curtain, a blind, a furniture, a light bulb, a fan, an air-conditioner, a cooler, an air purifier, a humidifier, a speaker, a television, a laptop, a personal computer, a gaming console, a remote control, a vent, an iron, a steamer, a pressure cooker, a stove, an electric stove, a hair dryer, a hair styler, a mirror, a printer, a scanner, a photocopier, a projector, a hologram projector, a 3D printer, a drill, a hand-dryer, an alarm clock, a clock, a security camera, a smoke alarm, a fire alarm, a connected doorbell, an electronic door lock, a lawnmower, a thermostat, a plug, an irrigation control device, a flood sensor, a moisture sensor, a motion detector, a weather station, an electricity meter, a water meter, and a gas meter.

By further ways of example, the IoT device for use in a city, urban, or rural areas may be connected street lighting, a connected traffic light, a traffic camera, a connected road sign, an air control/monitor, a noise level detector, a transport congestion monitoring device, a transport controlling device, an automated toll payment device, a parking payment device, a sensor for monitoring parking usage, a traffic management device, a digital kiosk, a bin, an air quality monitoring sensor, a bridge condition monitoring sensor, a fire hydrant, a manhole sensor, a tarmac sensor, a water fountain sensor, a connected closed circuit television, a scooter, a hoverboard, a ticketing machine, a ticket barrier, a metro rail, a metro station device, a passenger information panel, an onboard camera, and other connected device on a public transport vehicle.

As further way of example, the communication IoT device may be a wearable device, or a device related to extended reality, wherein the device related to extended reality may be a device related to augmented reality, virtual reality, merged reality, or mixed reality. Examples of such IoT devices may be a smart-band, a tracker, a haptic glove, a haptic suit, a smartwatch, clothes, eyeglasses, a head mounted display, an ear pod, an activity monitor, a fitness monitor, a heart rate monitor, a ring, a key tracker, a blood glucose meter, and a pressure meter.

As further ways of example, the IoT device may be an industrial application device wherein an industrial application device may be an industrial unmanned aerial vehicle, an intelligent industrial robot, a vehicle assembly robot, and an automated guided vehicle.

As further ways of example, the IoT device may be a transportation vehicle, wherein a transportation vehicle may be a bicycle, a motor bike, a scooter, a moped, an auto rickshaw, a rail transport, a train, a tram, a bus, a car, a truck, an airplane, a boat, a ship, a ski board, a snowboard, a snow mobile, a hoverboard, a skateboard, roller-skates, a vehicle for freight transportation, a drone, a robot, a stratospheric aircraft, an aircraft, a helicopter and a hovercraft.

As further ways of example, the IoT device may be a health or fitness device, wherein a health or fitness device may be a surgical robot, an implantable medical device, a non-invasive medical device, and a stationary medical device which may be: an in-vitro diagnostic device, a radiology device, a diagnostic imaging device, and an x-ray device.

The person skilled in the art will also appreciate that the blocks in the circuit diagram of the transmitter 320 and the receiver 340 may refer to a combination of analog and digital circuits, and/or one or more controllers, configured with software and/or firmware, e.g. stored in one or more local storage units, that when executed by the transmitter 320 or the receiver 340 or the network 200 perform the steps as described above. One or more of the transmitter 320, the receiver 340 or the network 200, as well as any other combination of analog and digital circuits, may be included in a single application-specific integrated circuitry (ASIC), or several controllers and various digital hardware may be distributed among several separate components, whether individually packaged or assembled into a system-on-a-chip (SoC). The one or more transmitter 320, the receiver 340 or the network 200 may be any one of, or a combination of a central processing unit (CPU), graphical processing unit (GPU), programmable logic array (PAL) or any other similar type of circuit or logical arrangement.

The invention claimed is:

1. A receiver in a network for receiving an indication of personal data in a Hypertext Transfer Protocol, HTTP, message comprising a body, the receiver comprising: at least one processor; and memory comprising instructions executable by the at least one processor, the instructions when executed by the at least one processor, causes the receiver to:

receive the HTTP message comprising an appended header field indicating either presence or absence of personal data in the body from a transmitter;

determine if the HTTP message comprises personal data in the body based on the appended header field;

log the HTTP message; and anonymize or pseudo-anonymize the logged HTTP message.

2. The receiver according to claim 1, configured to tag the personal data in the HTTP message.

3. The receiver according to claim 1, configured to capture a header comprising the appended header field of the HTTP message using a logging framework.

4. The receiver according to claim 1, configured to parse the HTTP message if the appended header field indicates presence of personal data.

5. The receiver according to claim 1, wherein the appended header field comprises at least one key.

6. The receiver according to claim 1, wherein the HTTP message is an HTTP request message or an HTTP response message.

7. A method performed by a receiver in a network for receiving an indication of personal data in a Hypertext Transfer Protocol, HTTP, message comprising a body, the method comprising:

receiving the HTTP message comprising an appended header field indicating either presence or absence of personal data in the body from a transmitter;

determining if the HTTP message comprises personal data in the body based on the appended header field;

logging the HTTP message; and anonymizing or pseudo-anonymizing the logged HTTP message.

8. The method according to claim 7, comprising tagging of the personal data.

9. The method according to claim 7, comprising capturing of a header comprising the appended header field of the HTTP message using a logging framework.

10. The method according to claim 7, comprising parsing of the HTTP message if the appended header field indicates presence of personal data.

11. The method according to claim 7, wherein the appended header field comprises at least one key.

12. The method according to claim 7, wherein the HTTP message is an HTTP request message or an HTTP response message.

13. A computer program product comprising a non-transitory computer readable storage medium storing instructions that, when executed by a processor of a receiver, cause the receiver to perform the method according to claim 7.

14. A network for receiving an indication of personal data in a Hypertext Transfer Protocol, HTTP, message comprising a body, the network comprising a transmitter and a receiver, the network further comprising: at least one processor; and memory comprising instructions executable by the at least one processor, the instructions when executed by the at least one processor, causes the network to:

append a header field to the HTTP message by the transmitter, the appended header field indicating either presence or absence of personal data in the body;

transmit the HTTP message comprising the appended header field to the receiver from the transmitter;

receive the HTTP message comprising the appended header field;

determine if the HTTP message comprises personal data in the body based on the appended header field;

log the HTTP message; and anonymize or pseudo-anonymize the logged HTTP message.

* * * * *